(12) United States Patent
Gleason

(10) Patent No.: US 12,228,460 B2
(45) Date of Patent: *Feb. 18, 2025

(54) BRIDGED SLOT ON THE INSULATING AND SEATING CUP OF A BIMETALLIC PIPE SURFACE TEMPERATURE THERMOMETER

(71) Applicant: Gary W. Gleason, Germantown, TN (US)

(72) Inventor: Gary W. Gleason, Germantown, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/448,302

(22) Filed: Aug. 11, 2023

(65) Prior Publication Data

US 2023/0384167 A1 Nov. 30, 2023

Related U.S. Application Data

(63) Continuation of application No. 17/247,855, filed on Dec. 28, 2020, now Pat. No. 11,733,105.

(60) Provisional application No. 62/954,319, filed on Dec. 27, 2019.

(51) Int. Cl.
*G01K 5/48* (2006.01)
*G01K 1/08* (2021.01)
*G01K 1/143* (2021.01)
*G01K 5/56* (2006.01)
*G01K 5/62* (2006.01)

(52) U.S. Cl.
CPC .......... *G01K 5/48* (2013.01); *G01K 1/08* (2013.01); *G01K 1/143* (2013.01); *G01K 5/56* (2013.01); *G01K 5/62* (2013.01)

(58) Field of Classification Search
CPC ................ G01K 5/48; G01K 1/143
See application file for complete search history.

(56) References Cited

U.S. PATENT DOCUMENTS 6,033,110 A * 3/2000 O'Neill ............... G01K 5/62
374/208

FOREIGN PATENT DOCUMENTS

DE 3048485 A1 * 7/1982

OTHER PUBLICATIONS

Translation of DE3048485A1.*

* cited by examiner

*Primary Examiner* — Mirellys Jagan

(57) ABSTRACT

An improvement to bimetallic pipe thermometers utilizing insulating tubular seats. The present invention improves the insulating tubular seat by closing off the tail slot along a proximal end thereof with a bridge or stop. Going forward, users of such bimetallic pipe thermometers no longer need worry about the tail of the bimetallic coil sensor unintentionally slipping out of what is currently an opened-ended tail slot.

11 Claims, 3 Drawing Sheets

BRIDGED SLOT ON THE INSULATING AND SEATING CUP OF A BIMETALLIC PIPE SURFACE TEMPERATURE THERMOMETER

CROSS-REFERENCE TO RELATED APPLICATION

This application claims the benefit of priority, as a continuation thereof, of U.S. nonprovisional application Ser. No. 17/247,855, filed 28 Dec. 2020, the contents of which are herein incorporated by reference.

BACKGROUND OF THE INVENTION

The present invention relates to bimetallic pipe thermometers and, more particularly, a bridged slot on the insulating and seating cup of a bimetallic pipe thermometer.

The bimetallic pipe thermometer is used to measure the temperature of the curved surfaces of conduits. To facilitate this measurement, a bimetallic pipe thermometer may have an insulating and seating cup that engages on the curved surface of the pipe, protecting the bimetallic sensor that operatively associates with the curved surface for taking the temperature measurement. The insulating and seating cup protects the bimetallic sensor from drafts or heat from other sources that may negatively affect the accuracy of the bimetallic sensor's temperature reading.

Furthermore, the bimetallic sensor may be a coil formed by rolling a bimetallic strip into a spiral, wherein the distal end of the bimetallic strip, also known as the "tail", may be bent so as to radially extend away from the coil. The tail may move due to the changes in temperature, as the bimetallic strip by design converts a temperature change into mechanical displacement. The insulating and seating cup has a slot that is designed to allow the tail of the bimetallic sensor to move up and down while not allowing it to turn as the bimetallic sensor winds and unwinds in response to temperature changes. The slot provides a zero-point at which the gauge is calibrated. When the thermometer is not installed, the tail of the bimetallic sensor can easily slip out of the end of the slot, which could cause the thermometer to lose its calibration and very possibly become damaged. If the thermometer loses its calibration or becomes damaged, the result will be inaccurate or erroneous temperature readings.

As can be seen, there is a need for a bridged slot on the insulating and seating cup of a bimetallic pipe thermometer, which closes off an otherwise open end of the slot. This element joins the opposing sides of the slot (and thus a "bridge"). As a result of the bridged slot, the tail of the bimetallic sensor cannot slip out of the end of the slot when it is touched or is being handled. The improvement embodied in the present invention eliminates the possibility of the thermometer losing its calibration and/or becoming damaged when handled prior to or during installation.

SUMMARY OF THE INVENTION

In one aspect of the present invention, a method of improving a bimetallic pipe thermometer utilizing an insulating tubular seat with an open-ended tail slot, the method includes closing off the open-ended tail slot along a proximal end thereof with a stop.

In another aspect of the present invention, a tubular insulating seat for housing a bimetallic coil sensor with a tail, the tubular insulating seat includes the following: a longitudinal slot along a circumference of the tubular insulating seat so that the tail protrudes through the longitudinal slot, wherein the longitudinal slot is closed off at a proximal end of the tubular insulating seat; a curvature along the proximal end for interfacing with a conduit, wherein the bimetallic coil sensor is disposed adjacent or at the proximal end in such a way as to operatively associate with said conduit; and a top plate along a distal end of the tubular insulating seat.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an improvement to bimetallic pipe thermometers utilizing insulating tubular seats. The present invention improves the insulating tubular seat by closing off the tail slot along a proximal end thereof with a bridge or stop. Going forward, users of such bimetallic pipe thermometers no longer need worry about the tail of the bimetallic coil sensor unintentionally slipping out of what is currently an opened-ended tail slot.

Figure 1:
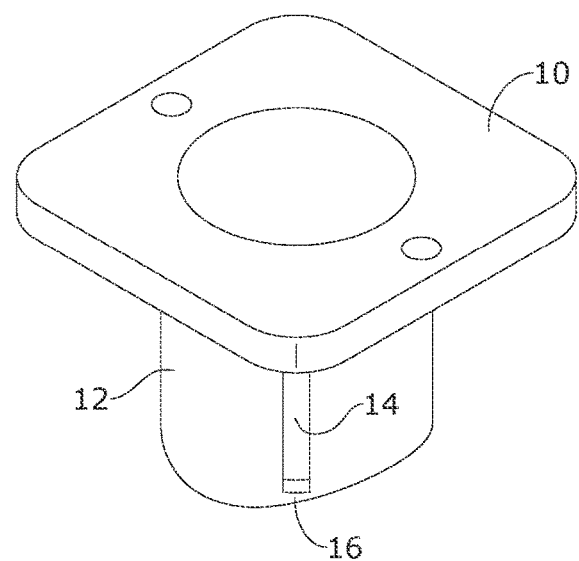
FIG. 1 is a top perspective view of an exemplary embodiment of the present invention.
Figure 2:
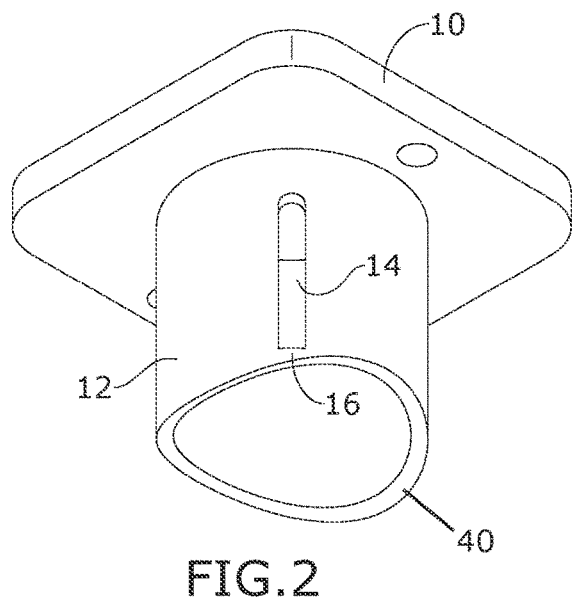
FIG. 2 is a bottom perspective view of an exemplary embodiment of the present invention.
Figure 3:
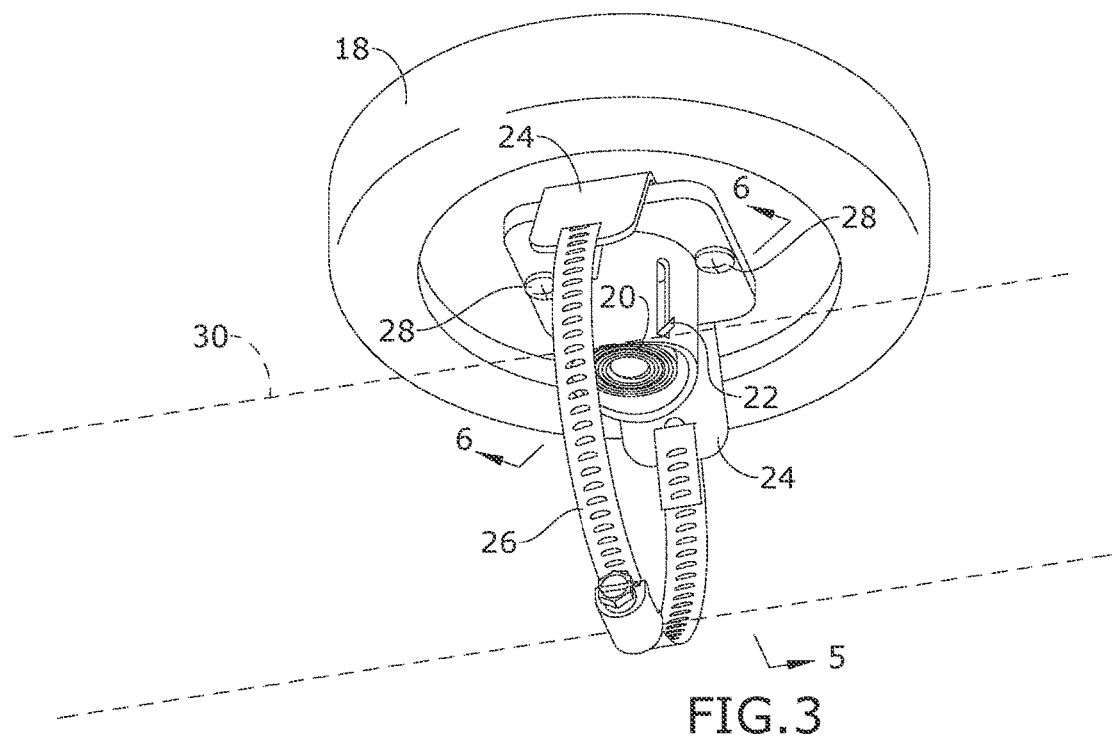
FIG. 3 is a bottom perspective view of an exemplary embodiment of the present invention, shown in use, with pipe 30 shown in hidden lines for clarity.
Figure 4:
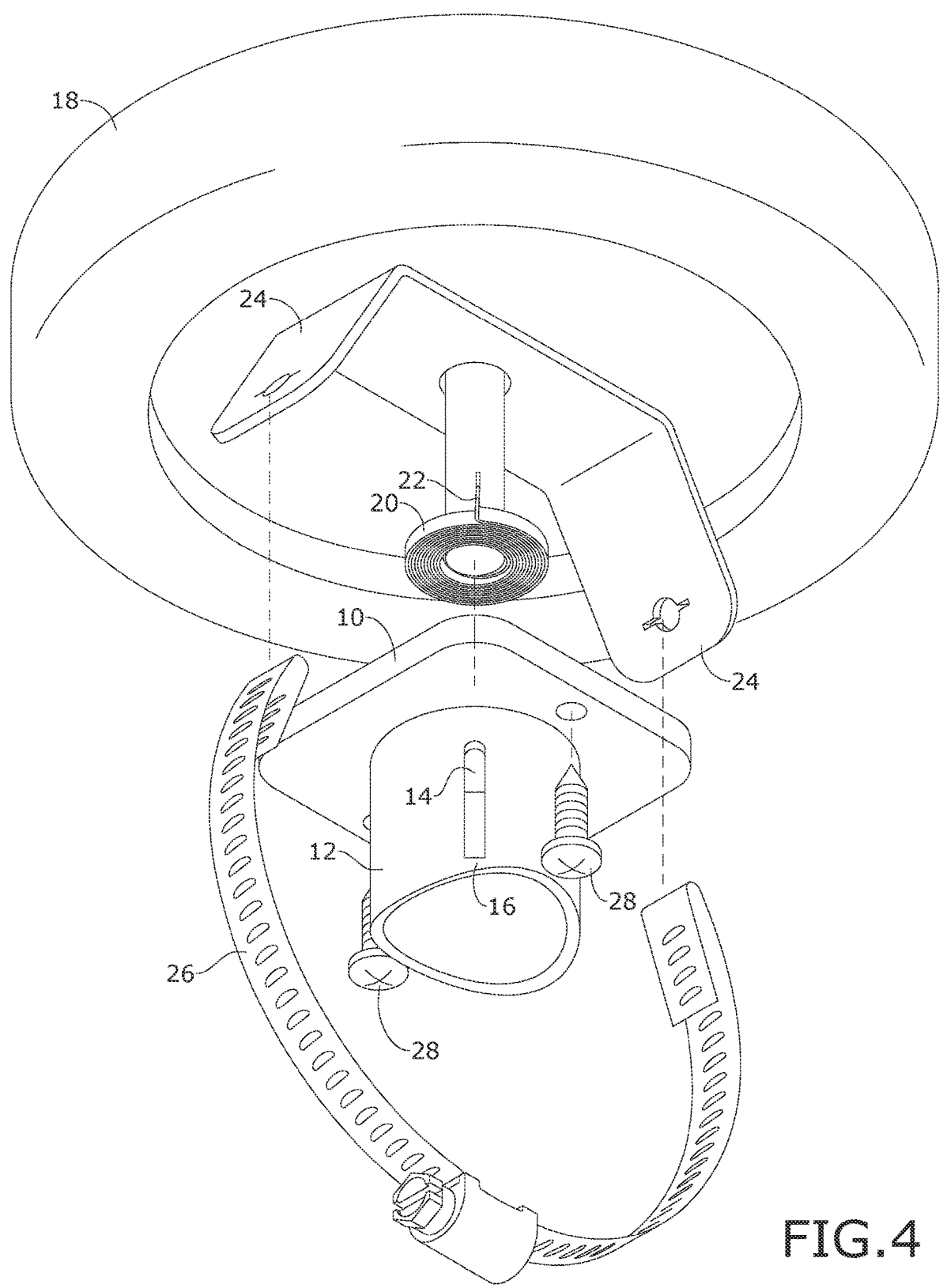
FIG. 4 is an exploded perspective view of an exemplary embodiment of the present invention.
Figure 5:
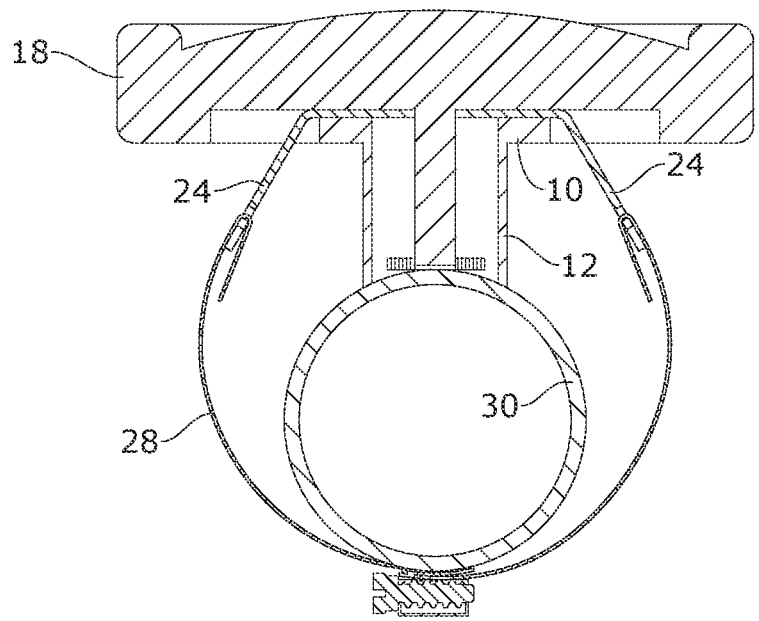
FIG. 5 is a section view of an exemplary embodiment of the present invention, taken along line 5-5 in FIG. 3.
Figure 6:
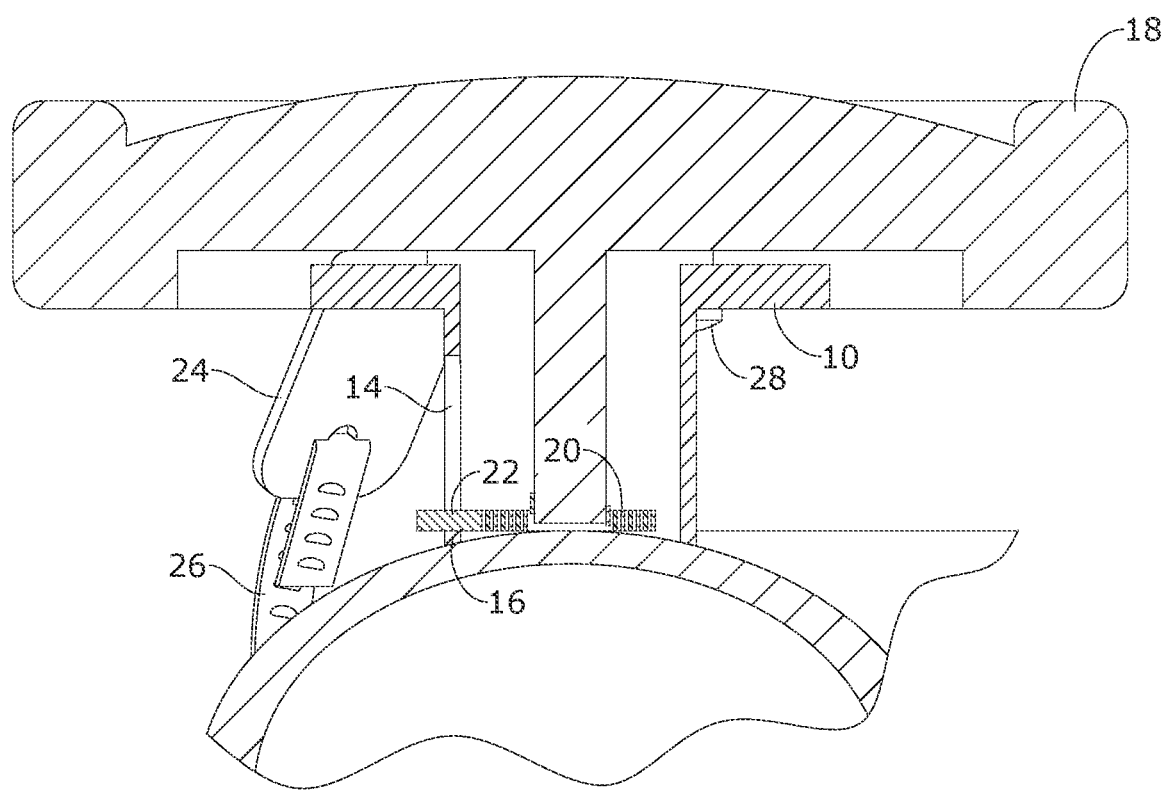
FIG. 6 is a top perspective view of an exemplary embodiment of the present invention, taken along line 6-6 in FIG. 3.

Referring now to FIGS. 1 through 6, the present invention may include a bridged slot on the insulating and seating cup 12 of a bimetallic pipe thermometer 18.

The insulating and seating cup 12 may have a top plate 10 at a distal end thereof, wherein the top plate 10 associates with a clip 24 of the bimetallic pipe thermometer 18. The clip 24 may engage a clamp 26 that circumscribes the circumference of a conduit 30 to secure the curved surface of the conduit 30 to the proximal end 40 of the insulating and seating cup 12. The proximal end 40 may have a curved edge to conform to said circumference. This longitudinal curvature of the insulating and seating cup 12 extends out of plane of a cross section of the insulating and seating cup 12.

The insulating and seating cup 12 is tubular whose lumen is dimensioned to house a bimetallic sensor coil 20 of the bimetallic pipe thermometer 18. The bimetallic sensor coil 20 is secured adjacent to the proximal end 40 so that when the proximal end 40 is secured to the conduit (by way of the clip 24, clamp 26, and fasteners 28) and the bimetallic sensor coil 20 operatively associates with (is seated on) a portion of the circumference of the conduit 30 to sense the temperature (gradient) thereof.

The insulating and seating cup 12 has a longitudinal slot 14, as shown in the illustrations. The bimetallic sensor coil 20 has an indicator tail 22 extending from the helical (rolled spiral) bimetallic sensor coil 20. The indicator tail 22 may be adapted to move as a function of the sensed temperature of the conduit 30, thereby providing easily readable indications of the temperatures sensed. The indicator tail 22 protrudes through the slot 14. The slot 14 would be otherwise open along the proximal end 40 but for a bridge 16. In certain embodiments, the slot 14 can simply be machined to include the closed-end bridge. In other embodiments, the bridge 16 may be retrofitted to a previous open slot 14. The addition of the closed-end, bridged slot would facilitate the handling and installation of the pipe thermometer, as the possibility of the tail 22 of the bimetallic sensor slipping out of the slot 14 and the thermometer losing calibration or being damaged is eliminated with the present invention. Thus, the present invention improves overall reliability of the thermometer.

Additionally, in any situation that this style of bimetallic pipe thermometer is used, the present invention would eliminate problems caused by an open-ended slot on the insulating and seating cup.

It should be understood, of course, that the foregoing relates to exemplary embodiments of the invention and that modifications may be made without departing from the spirit and scope of the invention as set forth in the following claims.

What is claimed is:

1. A method of improving a bimetallic pipe thermometer utilizing a tubular seat with an open-ended tail slot that extends longitudinally along a sidewall of the tubular seat, wherein the bimetallic pipe thermometer comprises a bimetallic coil sensor configured to convert temperature change to vertical mechanical displacement of a tail of the bimetallic coil sensor, the method comprising:

calibrating the bimetallic coil sensor by confining said tail in said open-ended tail slot until it is finally calibrated; and closing off a proximal end of the open-ended tail slot with a stop.

2. The method of claim 1, wherein the stop provides a stop curvature continuous with a curvature of a periphery of the tubular seat for improving installation of the bimetallic pipe thermometer to a circumference of a conduit.

3. A tubular insulating seat for housing a bimetallic coil sensor with an unrestrained tail, the tubular insulating seat comprising:

a longitudinal slot extending along a non-rotatable sidewall of the tubular insulating seat to just inward of a proximal edge of the tubular insulating seat so that the unrestrained tail protrudes through the longitudinal slot, wherein the unrestrained tail has a known calibration when protruding through the longitudinal slot; and a bridge at a proximal end of the longitudinal slot to separate the longitudinal slot from said proximal edge of the tubular insulating seat, preventing loss of the known calibration caused by the unrestrained tail vacating the longitudinal slot.

4. The tubular insulating seat of claim 3, wherein the bridge defines a stop curvature continuous with a curvature of a periphery of the tubular seat for improving installation of the bimetallic coil sensor to a circumference of a conduit.

5. The tubular insulating seat of claim 3, wherein the bimetallic coil sensor is configured to convert a temperature change to a vertical mechanical displacement of said unrestrained tail confined in said longitudinal slot.

6. The tubular insulating seat of claim 5, wherein the vertical mechanical displacement is in a direction that is longitudinally relative to said sidewall.

7. The tubular insulating seat of claim 3, further comprising:

a curvature along the proximal edge for interfacing with a conduit.

8. The tubular insulating seat of claim 7, wherein the bimetallic coil sensor is disposed adjacent the proximal end in such a way as to operatively associate with said conduit.

9. The tubular insulating seat of claim 8, further comprising:

a top plate along a distal end of the tubular insulating seat.

10. The tubular insulating seat of claim 9, further comprising:

a clip operatively associated with the top plate;

the clip having two ends extending beyond two diametrically opposing sides, respectively, of the tubular insulating seat; and an arcuate clamp that interconnects said two ends and said conduit.

11. The tubular insulating seat of claim 10, wherein the bimetallic coil sensor is configured to convert a temperature change to a vertical mechanical displacement of said unrestrained tail confined in said longitudinal slot, and wherein the vertical mechanical displacement is in a direction that is longitudinally relative to said sidewall.

* * * * *